G. A. ROHM.
INDICATOR.
APPLICATION FILED MAY 9, 1918.

1,310,444.

Patented July 22, 1919.

WITNESSES
J. M. Geoghegan.
Lois Vineman.

INVENTOR
Guston A. Rohm,
By J. N. Cooke,
Attorney.

UNITED STATES PATENT OFFICE.

GUSTAVE A. ROHM, OF TARENTUM, PENNSYLVANIA.

INDICATOR.

1,310,444. Specification of Letters Patent. Patented July 22, 1919.

Application filed May 9, 1918. Serial No. 233,552.

*To all whom it may concern:*

Be it known that I, GUSTAVE A. ROHM, a citizen of the United States, and a resident of Tarentum, in the county of Allegheny and State of Pennsylvania, have invented a new and useful Improvement in Indicators; and I do hereby declare the following to be a full, clear, and exact description thereof.

This invention relates to indicators, and more particularly to level indicators primarily designed for indicating the position of a flying machine, but which may be used for indicating the position of other moving objects.

The principal object of this invention is to provide a device of this class that will be accurate, will indicate by degrees any position of the machine or device on which it is used, and one that may be readily viewed by the operator of the machine or device upon which it is attached.

Generally speaking, my invention comprises a base portion having two circular indicating rings, each adapted to indicate any departure from the horizontal position. The device is adapted to be situated or placed at the front of the operator so that he may view the same without effort and readily ascertain the position of his machine. The whole device is preferably inclosed within a glass or other transparent casing so that it may operate with accuracy, and thereby avoid the action of the air currents affecting its true operation.

It will be readily understood that this device may be used on other moving objects, as for instance a ship, to indicate the position thereof, as a ship in the water has a rocking movement due to the action of the waves, and if the present device were secured on such ship, the amount of tilting or rocking movement could readily be ascertained in degrees by viewing the device.

Various other objects and advantages will be apparent from the following specification, the illustrations in the drawings and from the appended claims.

To enable others skilled in the art to which my invention appertains to construct and use my improved level indicator, I will describe the same more fully referring to the accompanying drawings, in which.

Figure 1:
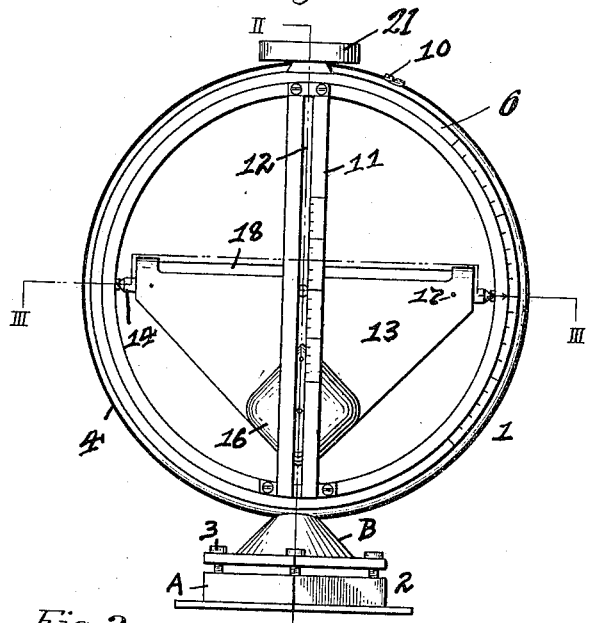
Figure 1 is a front elevation of a device constructed according to my invention.
Figure 2:
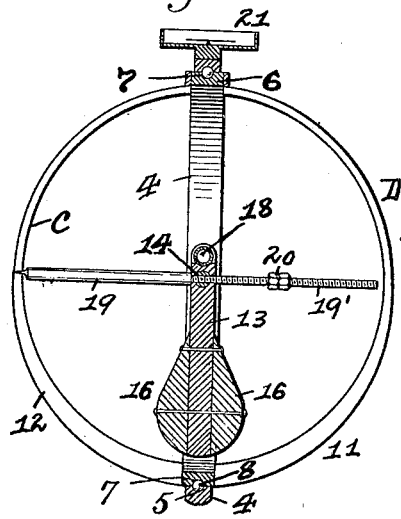
Fig. 2 is a view on the line 2—2 of Fig. 1.
Figure 3:
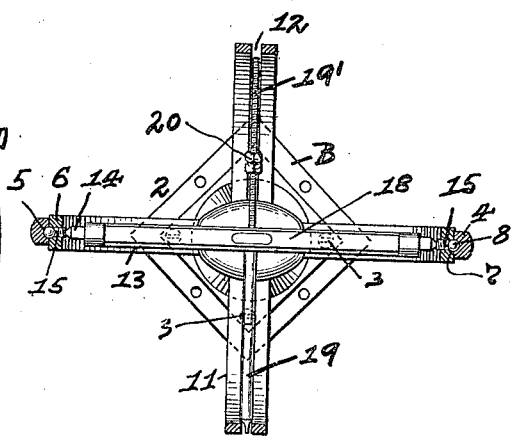
Fig. 3 is a sectional view on the line 3—3 of Fig. 1.

Referring more particularly to the drawings, the numeral 2 designates the base portion of the device 1, which is composed of two parts A and B adjustably mounted together by screw members 3, so that the device may be adjusted to a true level position before the object to which it is secured is set in motion. A stationary ring member 4 is secured to the upper portion of the part B of the base 2, and has its inner surface cut to form a grooved portion 5. A traveling ring member 6 having a groove 7 in its outer periphery is rotatably mounted within the ring 4, and is held in position by bearing balls 8, mounted in the grooves 5 and 7, and upon which the ring 6 travels.

The bearing balls 8 are adapted to be inserted in the grooves 5 and 7 through an aperture formed in the outer stationary ring 4, to form a track for the same, and this aperture is normally closed by a screw 10 having a shoulder formed thereon to prevent such screw running into the groove 5 and injuring or preventing proper movement of the ball bearing members 8.

A ring member 11 composed of two parts C and D is secured to the inner movable ring member 6 and is formed heavier at its lower end to give weight so that it will normally cause the ring member 6 to be retained at its zero or starting position due to the action of gravity. The ring member 11 is slotted, as at 12, to allow an indicator or hand member (hereinafter described) to travel, and thus indicate certain positions of the device. Both the rings 6 and 11 have indicia around their circumference, such as are suggested in the drawings, and which may be formed to indicate degrees. The indicia may be marked in any way desired so that they will stand boldly out from the background, such as using a white indicia on a black background, or a black indicia on a white background, as may be preferred.

A suitable triangular shaped pendulum 13 is mounted upon a needle point, pivot or shaft member 14, which is mounted on adjustable bearing members 15 secured in the inner ring 6. The pendulum member, when mounted as above described, will readily swing when the device is off center, but on account of its shape it would be lighter at the lower end, and therefore inaccurate in its movement. However, this lack of weight at its lower end is remedied by the addition of heavy weight members 16, which may be composed of lead or other heavy metal, and which are mounted at the lower end of the pendulum.

The shaft member 14 extends through the pendulum 13 below its top line, and is secured therein by suitable rivets or pins 17. The upper face of the pendulum 13 is cut away to form a recess in which is mounted, if possible, a spirit level 18. Mounted in the pendulum 13 and at a position on a line with the axis of the inner circle and through the shaft 14 is an indicator or hand member 19. This hand member is preferably screw-threaded through the pendulum 13, and its rear end extends an appreciable distance therethrough as at 19′. An adjustable weight 20 is carried on such rear end to counteract or balance the weight of the forward or point end thereof.

If it is desired, a suitable compass 21 of ordinary construction may be suitably mounted on the upper or top face of the device 1, as shown in Fig. 1 of the drawings, but preferably by a dove-tail mounting, or dove-tail tongue and groove mounting, and thereby permit of its removal if desired.

For the purpose of describing the operation of this device, it is preferred to treat the ring 4 as a transverse ring, the portion C of the ring 11 as the front, and portion D as the back of the device, with the front of the device being the portion facing the operator. If the device be attached to a flying machine and the machine started in motion, any upward movement of the machine will cause the hand or pointer member 19 to travel upwardly around the indicia on the ring 11 and thereby indicate the number of degrees of upward inclination of the flying machine. If the machine be tilted to the right, such movement will be indicated in degrees by the indicia on the outer ring 4 on account of the travel of the inner rings therein, and for the reason that the machine is tilted to the right, such inner ring will travel in an upward direction around the outer ring.

It will of course be understood that if the flying machine or other invention to which this invention should be attached should be tilted in the opposite direction from that above described, the movement will be just the reverse to what has been described.

A base 2 is formed adjustably so that the device may be brought to an accurate level before the machine to which it is secured is started in motion, and the adjustment of the base is secured when desired through the four support screw members 3. The accuracy of the adjustment of the base may readily be ascertained either by noting the position of the inner ring 6 and the hand member 19 in respect to their coöperating indicia, or by viewing the spirit level mounted in the top face of the pendulum 13.

It will be evident that equal inclinations of the apparatus to the right or left will give different readings on the scale 4, depending upon whether the plane of the rings 5 and 6 is vertical or inclined.

Various modifications and changes in the design and construction of my improved indicator may be resorted to without departing from the spirit of the invention or sacrificing any of its advantages.

Having thus described my invention, what I claim is:

1. A level indicator comprising a base, a stationary ring member secured to said base, a second ring member mounted on bearing balls within said first named ring, a third ring secured to said second ring and extending transversely thereof, a pendulum pivotally mounted in said second ring at diametrically opposite points, and means on said pendulum for coöperating with said third ring to indicate the inclination of the device.

2. A level indicator comprising a base, a stationary ring member secured to said base, a second ring member mounted to rotate within said first named ring, a third ring secured to said second ring and extending transversely thereof, a slot in said third ring, a weighted pendulum pivotally mounted at diametrically opposite points in the second ring, a pointer hand mounted on said pendulum on a line with the axis of said second ring and adapted to travel in a slot in said third ring, and indicia on said third ring for indicating the position of said pointer hand.

3. A level indicator comprising an adjustable base, a stationary ring member secured to said base, a second ring member mounted to rotate within said first named ring, bearing balls mounted between said first and second named rings and adapted to travel in grooves formed therein, a third ring secured to said second ring and extending transversely thereof, a pendulum pivotally mounted at diametrically opposite points in the second ring, and means on said pendulum for coöperating with said third ring to indicate the inclination of the device.

4. A level indicator comprising a base, a stationary ring member secured to said base, a second ring member mounted to rotate within said first named ring, a third ring secured to said second ring and extending transversely thereof, a slot in said third ring, a weighted pendulum pivotally mounted at diametrically opposite points in the second ring, a pointer hand mounted through said pendulum on a line with the axis of said second ring and adapted to travel in a slot in said third ring, a counter weight mounted on said pointer hand, and indicia on said third ring for indicating the position of said pointer hand.

5. A level indicator comprising an adjustable base, a stationary ring member secured to said base, a second ring member mounted to rotate within said first named ring, a third ring member secured to said second ring on a line with its vertical axis and extending transversely thereof, said last named ring having its lower half gradually increasing in size to give it weight, a pendulum pivotally mounted at diametrically opposite points in the second ring, and means on said pendulum for coöperating with said third ring to indicate the inclination of the device.

6. An instrument for measuring inclination comprising a normally horizontal base, a vertical ring carried by the base, a second and concentric ring rotatably mounted inside the first ring, a third vertical ring rigidly mounted in the second ring in transverse relation thereto, a horizontal shaft pivotally mounted at diametrically opposite points in the second ring, a pendulum fixed on the shaft and a transverse pointer fixed on the shaft and adapted to coöperate with the third ring to indicate inclination of the device.

7. An instrument for measuring forward or sidewise inclination comprising a fixed normally horizontal base, a vertical ring carried by the base, a groove on the interior of the ring, a concentric ring having an outer groove mounted inside the first ring and rotatably connected thereto by balls in said groove, indicia to measure rotation of the free ring in either direction, a horizontal shaft mounted inside the second ring, a pendulum fixed to the shaft, a transverse pointer fixed to the shaft, and a calibrated transverse ring fixed to the second ring and adapted to coöperate with said pointer to measure rotation of the pendulum shaft.

In testimony whereof, I, the said GUSTAVE A. ROHM, have hereunto set my hand.

GUSTAVE A. ROHM.

Witneses:
I. GEORGE DERBAUM,
J. P. BLISSELL.

Copies of this patent may be obtained for five cents each, by addressing the "Commissioner of Patents, Washington, D. C."